(12) United States Patent
Ogura

(10) Patent No.: US 7,051,448 B2
(45) Date of Patent: May 30, 2006

(54) MEASURING MACHINE

(75) Inventor: Katsuyuki Ogura, Utsunomiya (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 10/823,459

(22) Filed: Apr. 13, 2004

(65) Prior Publication Data

US 2004/0205974 A1  Oct. 21, 2004

(30) Foreign Application Priority Data

Apr. 15, 2003  (JP)  ............... 2003-110329

(51) Int. Cl.
*G01B 5/004* (2006.01)
(52) U.S. Cl. ........................................ 33/503
(58) Field of Classification Search .................. 33/503, 33/502, 567, 1 M
See application file for complete search history.

(56) References Cited

U.S. PATENT DOCUMENTS

| | | | | |
|---|---|---|---|---|
| 5,867,916 A * | 2/1999 | Matzkovits | .................. | 33/503 |
| 6,041,511 A * | 3/2000 | Broghammer | ............... | 33/503 |
| 6,427,355 B1 * | 8/2002 | Tano | ........................ | 33/567 |
| 6,513,253 B1 * | 2/2003 | Matsuda et al. | ............. | 33/502 |
| 6,941,669 B1 * | 9/2005 | Shivaswamy et al. | ........ | 33/502 |
| 2003/0233760 A1 * | 12/2003 | Lotze | ......................... | 33/502 |
| 2004/0231177 A1 * | 11/2004 | Mies | ........................... | 33/503 |
| 2005/0160612 A1 * | 7/2005 | Kikuchi | ...................... | 33/503 |

FOREIGN PATENT DOCUMENTS

| | | |
|---|---|---|
| JP | 03-223473 | 10/1991 |
| JP | 05-200525 | 8/1993 |
| JP | 06-170514 | 6/1994 |
| JP | 07-253004 | 10/1995 |
| JP | 2000-065561 | 3/2000 |
| JP | 2001-009555 | 1/2001 |
| JP | 2002-306051 | 10/2002 |

* cited by examiner

*Primary Examiner*—G. Bradley Bennett
(74) *Attorney, Agent, or Firm*—Rankin, Hill, Porter & Clark LLP

(57) ABSTRACT

A guide rail (21) having a guide surface for guiding sliding movement of a movable body (5) is monolithically formed on a base (2) of a measuring machine (1). A coating film for rust prevention is formed on the guide surface. With this feature, it is not necessary to attach the guide rail (21) as a discrete member to the base (2), so that a number of steps in the manufacture process and the production cost can be reduced. Further as the base (2) and the guide rail (21) are made of the same material, the bimetal effect does not occur, which insures the stability of the base (2) against changes due to aging.

9 Claims, 4 Drawing Sheets

MEASURING MACHINE

BACKGROUND OF THE INVENTION

1. Field of the Invention

The present invention relates to a measuring machine. More specifically this invention relates to a measuring machine comprising a base, a guide rail provided on the base with a guide surface thereon, and a movable body slidably provided via an air bearing device on the guide surface of the guide rail.

2. Description of Related Art

Surface texture measuring machines for measuring surface texture such as dimension and profile of the object to be measured have been known. As a representative example of such a surface-texture measuring machine, the known one is three-dimensional measuring machine (refer to, for instance, Japanese Patent Laid-Open Publication No. 2000-65571). Of the three-dimensional measuring machines as described above, there is one in which a gauge head thereof moves in one horizontal direction (X-axial direction) and in direction of gravitational force vertical to the X-axial direction (Z-axial direction), and further a table with an object to be measured placed thereon moves along a guide rail provided on the base in the Y-axial direction perpendicular to the X-axial direction and to the Z-axial direction to measure three-dimensional data of the object to be measured.

In the three-dimensional measuring machine as described above, cast metal is used for the base and table to minimize changes due to aging. For the guide rail, stainless steel is used to prevent rust. As shown in FIG. 4, for instance, a guide rail 92 made of stainless steel is provided on a base 91 for rust prevention.

In the three-dimensional measuring machine based on the conventional technology as described above, it is necessary to assemble the guide rails each manufactured as a discrete component on the base by tightening with screws, which disadvantageously requires a number of steps in the manufacturing process and high cost.

In addition, because of difference in materials for the base 91 and for the guide rail 92, the bimetal effect occurs due to the fine difference of the linear expansion coefficients between the two types of materials, which disadvantageously causes performance degradation such as deviation in measurement.

SUMMARY OF THE INVENTION

It is a primary object of the present invention to provide a measuring machine enabling simplification of the structure and insuring stability of the base against changes in temperature as well as stability of the guide surface against changes due to aging.

The present invention provides a measuring machine comprising a base, a guide provided on the base and having a guide surface, and a movable body slidably provided via an air bearing device on the guide surface of the guide rail, and the guide rail is formed monolithically with the base, and a coating for rust prevention is formed on the guide surface.

Herein the base indicates a member and a structural body slidably supporting the movable body.

With the present invention, as the guide rail is monolithic with the base, after the base is manufactured, it is not necessary to mount a guide rail formed as a discrete member on the base. Therefore, a number of steps in the base manufacture process and its manufacturing cost can be reduced, which enables improvement in the efficiency of the base manufacturing process.

Further as the base and guide rail are formed in the monolithic state, the same material is used for the both components. Because of this feature, it is possible to prevent the bimetal effect which occurs when members made of different materials each having a different expansion coefficient respectively are jointed to each other. Because of this feature, deformation of the base is suppressed and stability of the base against changes due to aging is insured.

Further a coating for rust prevention is formed on a guide surface of the guide rail. Sometimes, cast metal is used as a material for the base to keep the stability of the base against changes due to aging, but rusting may occur on the cast metal. When rust is formed on the guide surface, not only the guide surface changes in its form and state, but also the sliding movement of the movable body guided by the guide surface becomes instable. Therefore, by forming the coating for rust prevention on the guide surface, rusting on the guide surface can be prevented, thereby the form and state of the guide surface can be preserved, and the stability of the movable body during the sliding movement against changes due to aging can be insured.

In addition, as the movable body slides via an air bearing device, vibration generally caused in association with the sliding movement can be suppressed.

In the present invention, preferably the coating is made of ceramics.

With the present invention as described above, as the ceramic coating is formed on the guide surface, the excellent surface roughness can be realized. Namely, as ceramics is coated on the guide surface, a homogeneous and flat guide surface without any irregularity can be formed. Because of this feature, the air gap formed by air outputted from the air bearing between the movable body and the guide surface can always be kept in the stable state. Further the guide surface from which air is outputted is flat, so that the air pressure generated by the air bearing can be maintained at a constant level. Therefore, the sliding movement of the movable body by the air bearing can be stabilized.

Further the ceramics includes the material having such properties as the anti-corrosion property and heat resistance property. By coating the guide surface of the guide rail with the material as described above to form a ceramic firm thereon, the further improved anti-corrosion property and heat-resistance property can be provided.

In the present invention, the coating film is preferably formed by means of plasma spray coating.

With the present invention as described above, it is possible to prevent the coating film from separating from the guide surface. Namely, by means of plasma spray coating, strong binding forces between particles forming the coating film and between the particle and the material can be obtained. Therefore, adhesion between the coating film and the base can be strengthened, so that separation of the coating film can be prevented.

Further by raising the plasma output during the plasma spray coating, the adhesion efficiency of the particles can be improved, and it is possible to reduce the porosity and raise the Vickers hardness on a cross section of the coating film. Because of this feature, it is possible not only to form a homogeneous coating film with low porosity and no irregularity, but also to raise the hardness of the coating film. Therefore, as a homogeneous and flat surface with high hardness can be formed with a coating film formed on the guide surface, the sliding movement of the movable body guided by the guide surface can be stabilized.

Theoretically there is no upper limit for temperature of gas plasma used for plasma spray coating. Therefore the freedom in selection of a material for spray coating to form a coating film can be increased.

BRIEF DESCRIPTION OF THE INVENTION

DETAILED DESCRIPTION OF PREFERRED EMBODIMENT(S)

An embodiment of the present invention is described below with reference to the related drawings.

Figure 1:
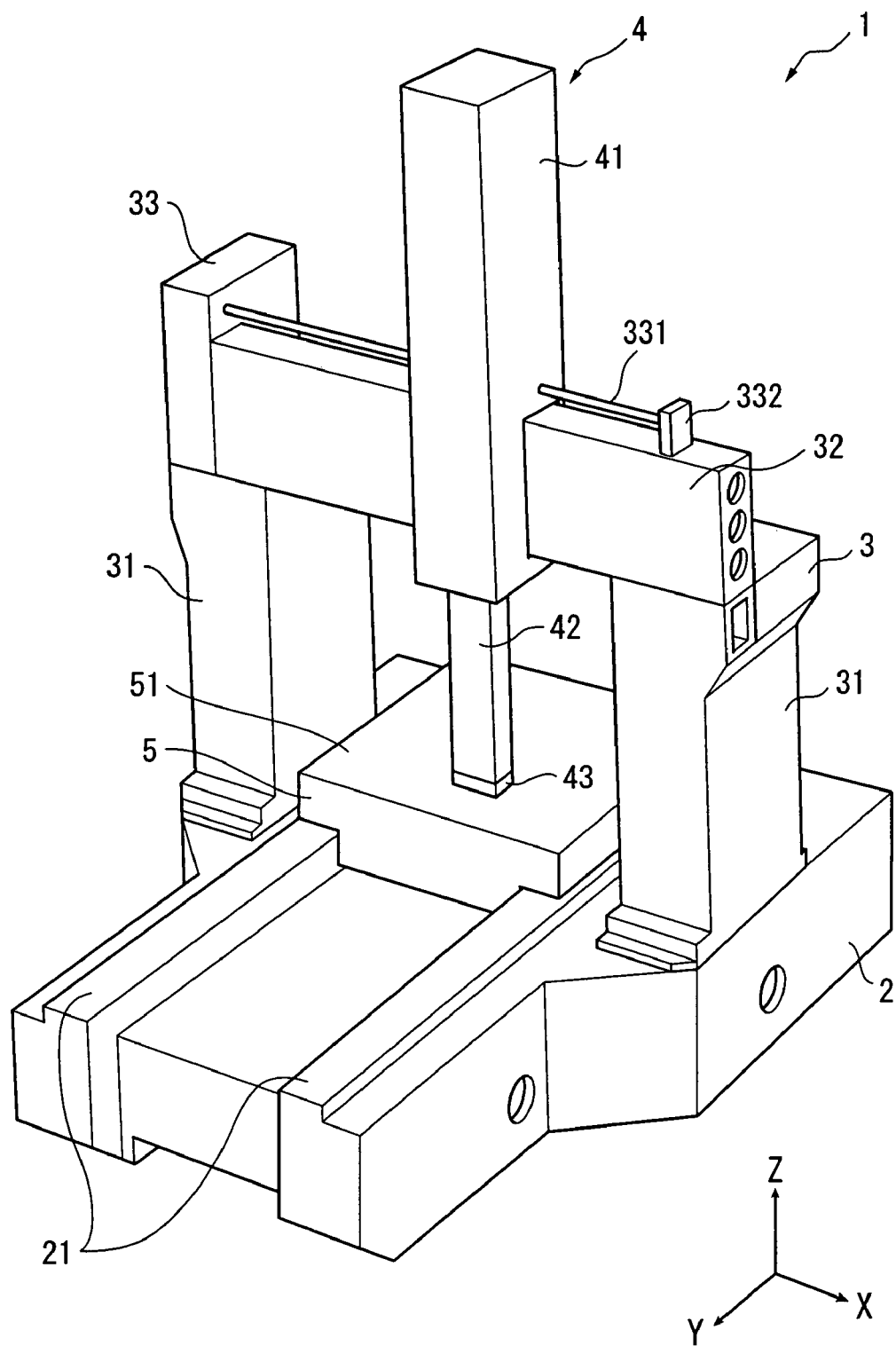
FIG. 1 is a schematic perspective view showing a three-dimensional measuring machine according to an embodiment of the present invention.

FIG. 1 shows a three-dimensional measuring machine according to the present invention.

In this figure, a three-dimensional measuring machine 1 comprises a base 2 having a Y-axial guide section 21, a bridge type column 3, a slider 4 having a probe (not shown) as a measuring element, and a table 5 constituting a mount surface 51. Configuration of the base 2 is described in detail below. The bridge type column 3 is formed in the erecting state on a top surface of the base 2. The bridge type column 3 is used to move the slider 4 back and forth in the lateral direction of the three-dimensional measuring machine 1, namely in the X-axial direction indicated by the sign X in FIG. 1. The bridge type column 3 has two columns 31, an X-axial guide section 32, and a slider driving mechanism 33.

The two columns 31 form a leg section of the bridge type column 3, and are provided in the substantially vertical state at two edge sections in the lateral direction of the top surface of the base 2 at substantially central positions in the longitudinal direction thereof respectively. Provided on top ends of these columns 31 is the X-axial guide section 32 spanning in the substantially horizontal state between these two columns 31. The X-axial guide section 32 is used to guide the slider 4 in the X-axial direction, and is formed with a substantially rectangular cast metal member with the dimension in the lateral direction (X-axial direction) larger than the dimension in the height (Z-axial direction).

Provided on a top surface of the X-axial guide section 32 is the slider driving mechanism 33 used to move the slider 4 in the X-axial direction. The slider driving mechanism 33 have a driving mechanism (not shown in the figure and comprising a motor, a pulley, a belt and the like), an X-axial guide shaft 331, and a fixed section 332. The X-axial guide shaft 331 is used to deliver a driving force from the driving mechanism to the slider 4, while the fixed section 332 is used to support the X-axial guide section 331 on a top surface of the X-axial guide section 32 so that it can freely rotate in the axial direction.

The slider 4 comprises a probe (not shown in the figure), and moves the probe in the vertical direction, namely in the Z-axial direction indicated by sign Z in FIG. 1. The slider 4 comprises, in addition to the probe, a slider main body 41, a spindle 42, and a probe head 43.

The slider main body 41 is covered with a casing made of steel. Attached to a lower edge of the slider main body 41 is a spindle 42 together with the driving mechanism (not shown) so that it can freely move in the Z-axial direction. Provided at a tip of the spindle 42 is a probe head 43 for attaching the spindle 42 to the probe. The probe head 43 has the configuration in which various types of probes can be attached thereto. Further the probe head 43 is dismountably attached thereto so that it can be replaced with a new one, if necessary. It is to be noted that the probe attached thereto may be either of the contact type or of the non-contact type.

The table 5 is a substantially rectangular-shaped cast metal member with a rib formed inside thereof and a mount surface 51 for mounting an object to be measured formed on a top surface thereof. The table 5 is places on the base 2, and slides on the base 2 in the longitudinal direction of the three-dimensional measuring machine 1, namely in the Y-axial direction indicated by the sign Y in FIG. 1. Configuration of the table 5 and arrangement of the table 5 on the base 2 are described in detail hereinafter.

Figure 2:
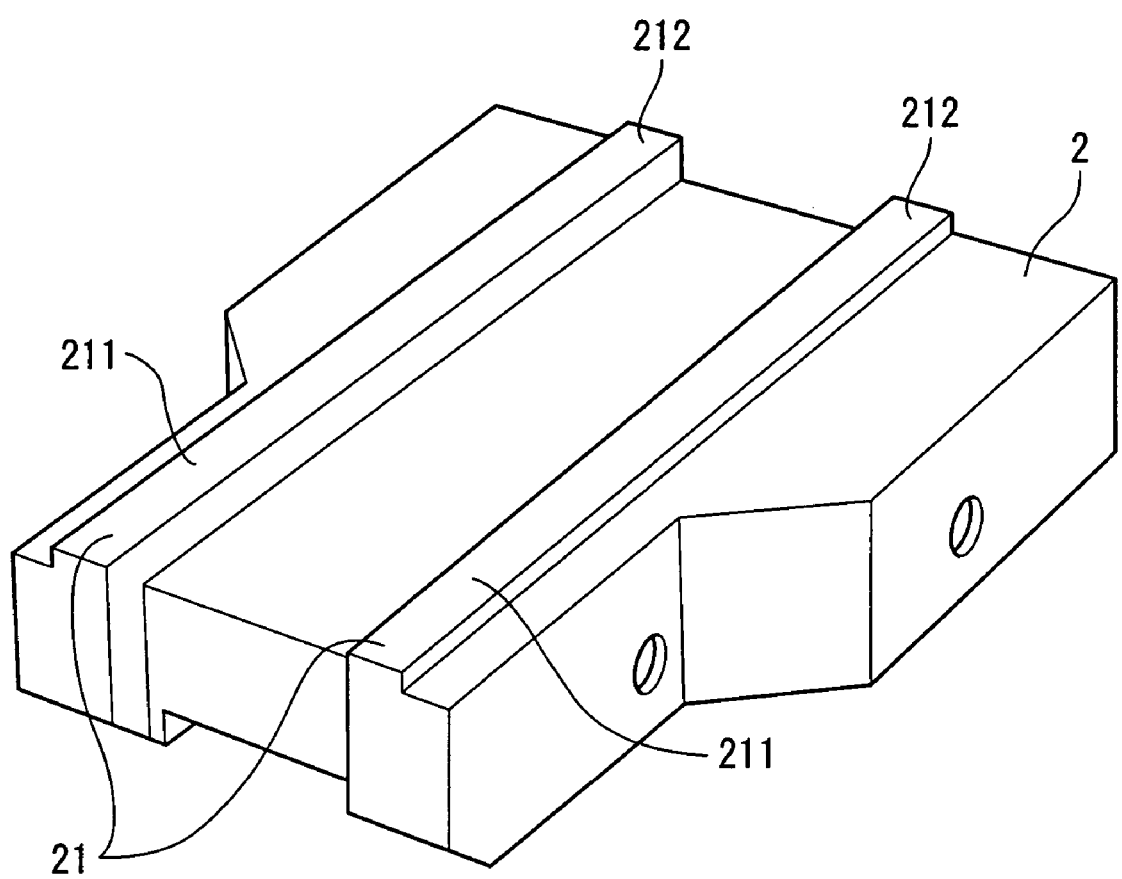
FIG. 2 is a schematic perspective view showing a base in the embodiment above.

FIG. 2 shows the base 2 of the three-dimensional measuring machine 1.

The base 2 plays a role as a basement for the three-dimensional measuring machine 1, and is made of cast metal the main ingredient of which is iron. In this figure, the Y-axial guide section 21 monolithically cast with the base 2 is provided on the top surface of the base 2. The Y-axial guide section 21 is used to guide sliding movement of the table 5 in the Y-axial direction indicated by the sign Y in FIG. 1, and comprises two rails 211 each having a substantially concaved form and extending in substantially parallel to the longitudinal direction (Y-axial direction) of the base 2.

A guide surface 212 for guiding the sliding movement of the table 5 is formed on each of the rails 211. The guide surfaces 212 are provided on top surfaces of the rails 211 as well as on side faces of the rails 211 opposing to each other. The guide surface 212 is coated with ceramics to form a coating film. Namely, the guide surface 212 is coated with the ceramics by means of directly plasma spray-coating the ceramics onto the cast metal member as a material for the guide surface 212. The plasma output for coating is set at a high level, which insures the higher adhesion efficiency of the ceramic material to the guide surface 212. Any ceramic material having the rust-preventing effect, anti-corrosion property and heat resistance property may be selected and used for this purpose. In this embodiment, alumina-based ceramic material is used, but other materials may also be used for this purpose.

Figure 3:
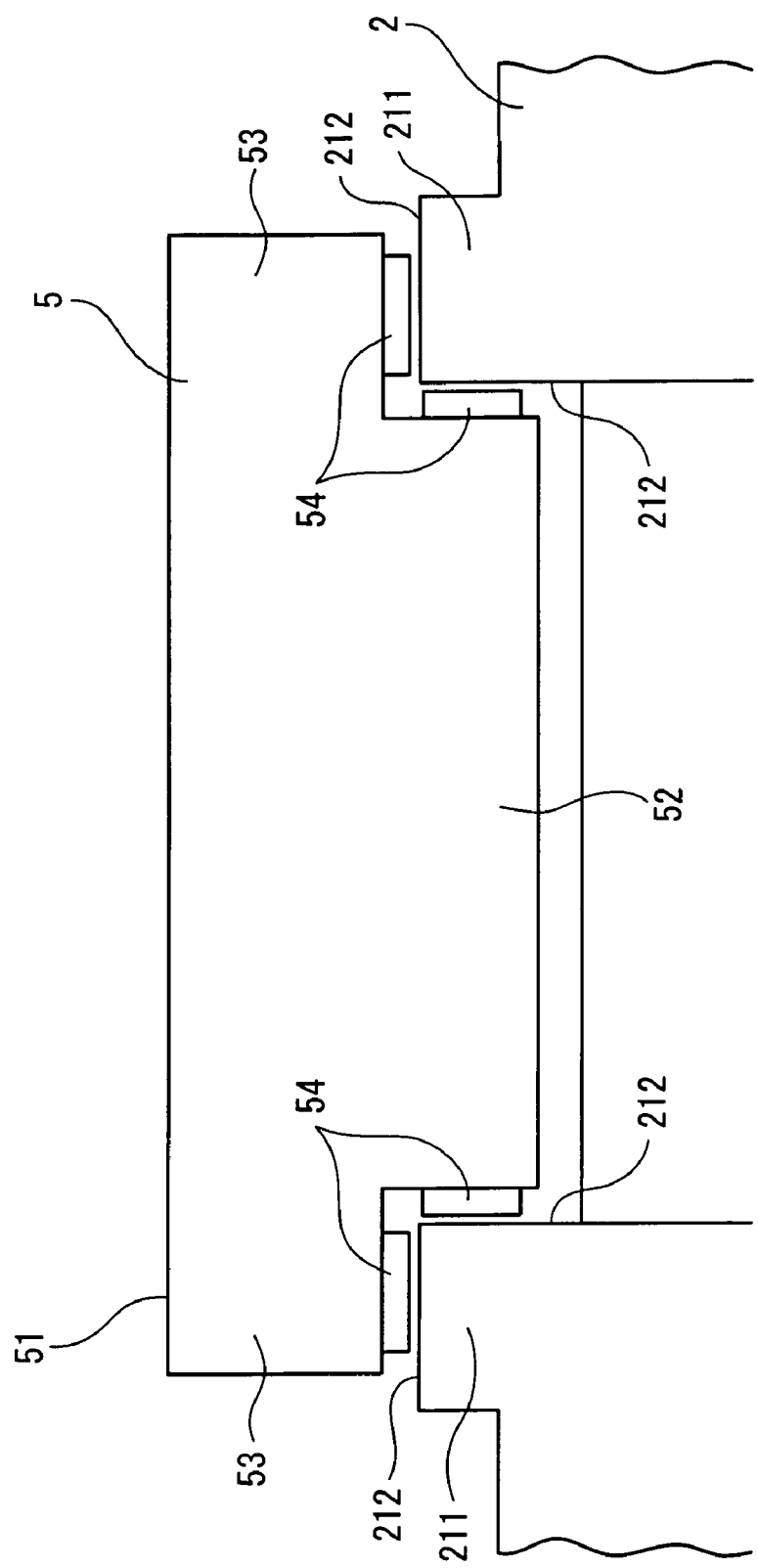
FIG. 3 is a front view showing a portion of the base and a table in the embodiment above.
Figure 4:
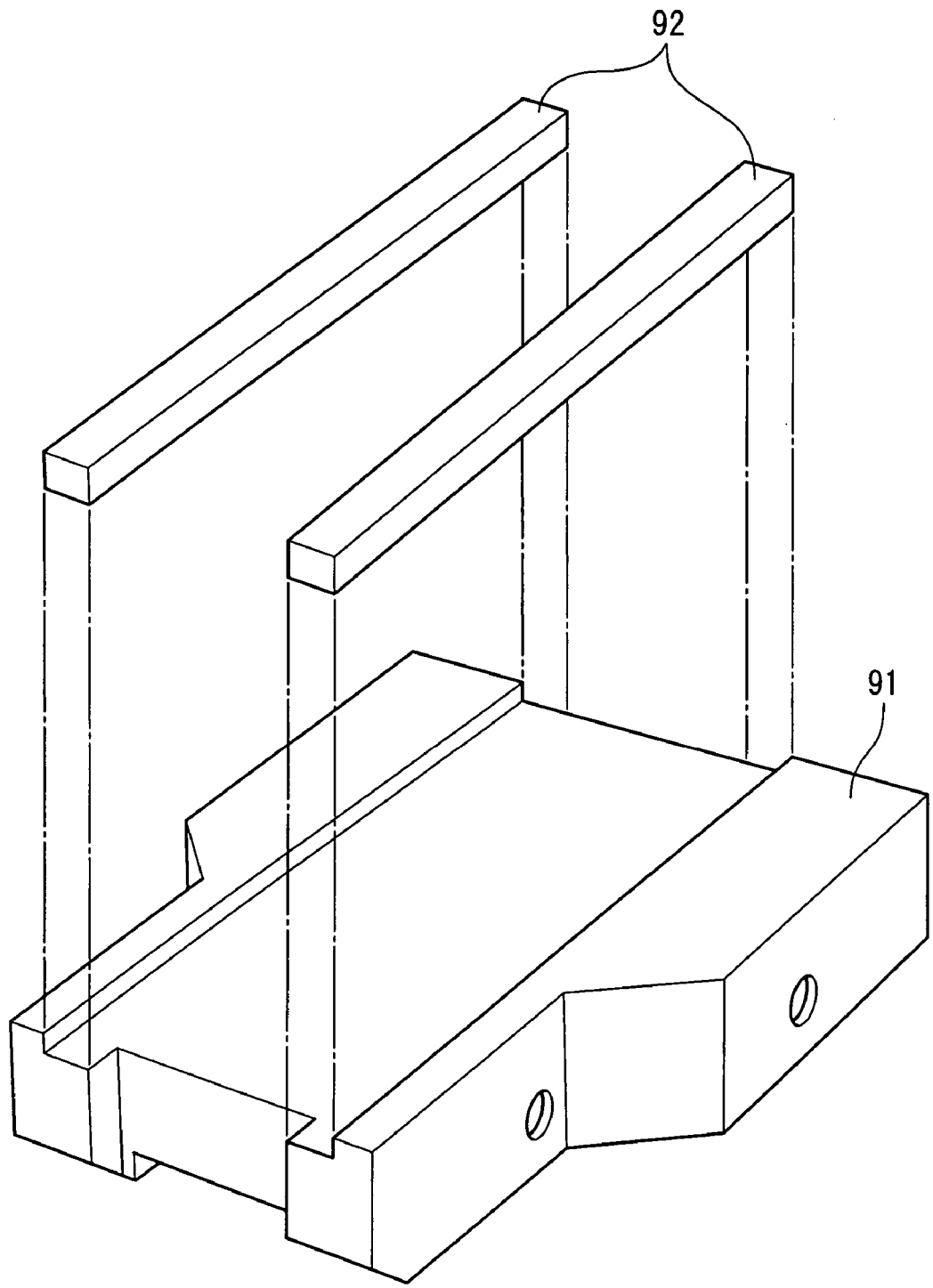
FIG. 4 is a schematic perspective view showing a base and a guide rail in a three-dimensional measuring machine based on the conventional technology.

FIG. 3 is a front view showing a portion of the base 2 and the table 5.

In this figure, the table 5 comprises a central portion 52 extending downward and formed at a center of the table 5, and overhanging sections 53 formed at both edges of the table 5 in the lateral direction thereof (X-axial direction), and these sections form a substantially T-shaped form when viewed from a front side of the three-dimensional measuring machine 1.

The table 5 is provided so that a side face of the central portion 52 and bottom faces of the overhanging sections 53 face against the guide surface 212. A plurality of air bearings 54 are provided on the side face of the central portion 52 and on the bottom faces of the overhanging sections 53, and these air bearings 54 slidably support the table 5, and also suppress friction and vibration.

In the present embodiment, the Y-axial guide section 21 is monolithically formed with the base 2. Because of the feature, it is not necessary to attach the Y-axial guide section 21 as a discrete member to the base 2. Therefore a number of steps in the manufacture process and the production cost can be reduced and the efficiency in manufacturing the base 2 can be improved.

Further as the base 2 and the Y-axial guide section 21 are formed monolithically, a material for the base 2 is the same as that for the Y-axial guide section 21. Because of this feature, the deformation of the base 2 due to the bimetal effect caused by difference in the linear expansion coefficient can be eliminated. Therefore, deformation of the base 2 can be prevented, the stability of the base 2 against changes due to aging can be insured and the measurement precision of the measuring machine can be improved.

The guide surface 212 of the Y-axial guide section 21 is coated with ceramics having the rust-preventing effect. Therefore, rusting of the guide surface 212 can be prevented, and the stability of the table 5 sliding under guidance by the Y-axial guide section 21 against changes due to aging can be insured.

Further the table 5 slides via the air bearings 54, so that vibration of the table 5 caused by its sliding movement can be suppressed.

In the present embodiment, a ceramic coating film is formed on the guide surface 212, so that the guide surface 212 is formed into a homogenous and flat surface without irregularities. Because of this feature, an air gap generated by air outputted from an air pad of the air bearing 54 and formed between the air pad and the guide surface 212 can always be kept in the stable state. Further as the guide surface 212 is a flat surface, the air pressure from the air bearing 54 can always be kept in the constant state. Therefore, the sliding movement of the table 5 via the air bearings 54 can be stabilized, which insures the improved straightness precision in measurement.

Further as the titania-based ceramic material allowing to realize anti-corrosion property and heat resistance property is used, so that the anti-corrosion property and heat resistance property of the guide surface 212 can further be improved.

In the present embodiment, the guide surface 212 is coated with ceramics by means of plasma spray coating, so that adhesion between the coating film and the guide surface 212 can be enhanced. Therefore, separation of the coating film from the guide surface 212 can be prevented.

Further as the plasma output is large, the efficiency in adhesion of the ceramic material to the guide surface 212 can further be improved, and a homogenous coating film with the low porosity can be formed. Therefore, a homogeneous and flat surface is formed with the coating film formed on the guide surface 212, so that the sliding movement of the table on the guide surface 212 can be stabilized. In addition, the hardness of the coating film formed as described above can be raised, so that the stability of the coating film and the Y-axial guide section 21 against changes due to aging can be insured, which also contributes to realization of stable sliding movement of the table 5.

Further, it is possible to spray-coat a material with the high melting point, so that the material is not limited to the titania-based ceramic material used in this embodiment, and other materials may be selected for this purpose. Therefore, the freedom in selection of the coating material can be increased.

The present invention is not limited to the embodiment above, and modifications and improvements within a scope in which the object of the present invention can be achieved are included in this invention.

In the embodiment described above, the guide surface 212 of the Y-axial guide section 21 is coated with a ceramic material by means of plasma spray-coating, the present invention is not limited to this coating method but can be other methods such as, for instance, the flame spraying, arc spraying, and laser spraying. Incidentally, when the plasma spray-coating method is employed, as the range of selectable ceramic materials is large, the ceramic material can be selected from among a number of candidate ceramic materials for use. Further separation of the ceramic coating can be prevented, which provides various effects including insured stability of the coating film.

In the embodiment described above, the titania-based ceramics is used as the ceramic material, but the present invention is not limited to this material. Namely, any ceramic material may be used on the condition that the coating film formed by means of coating with the material provides the rust prevention effect. For instance, such ceramic materials as zirconia-based, alumina-based, stainless steel-based, mullite-based, and magnesia-based ceramic materials may be employed for this purpose.

In the embodiment described above, the guide surfaces 212 are formed on top surfaces of the rails 211 and side faces of the two rails 211 facing to each other, but the present invention is not limited to this configuration. For instance, the guide surfaces 212 may be formed on the top surfaces as well as on external side faces of the rails 211 respectively, and in this case, it is required only that the coating film is formed on each of the guide surfaces 212. Further, in this case, the configuration is allowable in which each of the overhanging sections 53 of the table 5 has a concaved form opening downward, the table 5 is placed to cover the rails 211, and the air bearings 54 are provided on a surface opposite to the guide surfaces 212 of the rails 211. With this configuration, resistance and vibration during the sliding movement of the table 5 can be suppressed without fail.

In the embodiment described above, the base 2, table 5, and X-axial guide section 32 are made of a cast metal, but the present invention is not limited to this material, but can be other materials such as steel, porphyry, or the like. Incidentally, when the base 2, table 5, and X-axial guide section 32 are manufactured with cast metal, as cast metal changes little due to aging, deformation of the base 2, table 5, and X-axial guide section 32 can be prevented even if the components are used for a long period of time. Further, the stability in the sliding movements of the slider 4 and table 5 can be insured against changes due to aging.

In the embodiment described above, measurement in the Y-axial direction of an object to be measured is performed by sliding the table 5 with the object placed thereon in the Y-axial direction, but in this invention, the configuration is allowable in which the table 5 is fixed and measurement is performed by sliding the bridge type column in the Y-axial direction. In this case, the bridge type column 3 may be slid along the Y-axial guide section 31 provided on the base 2. Incidentally, when the table 5 can slide in the Y-axial direction, vibration and a measurement deviation can be suppressed to smaller ones as compared to the case where the bridge type column 3 having a larger weight is moved.

In the embodiment described above, the three-dimensional measuring machine 1 has the bridge type column 3, but the present invention is not limited to this configuration, and is applicable to a three-dimensional measuring machine having a single arm column or the like. Description of the embodiment above assumes use of a three-dimensional measuring machine, but the present invention is not limited to this configuration, and the present invention may be applicable to other types of measuring machines such as an image measuring machine. Namely, the present invention can be carried out by using any type of three-dimensional measuring machine so long as the measuring machine comprises a base and a guide rail.

Description of the embodiment above assumes the case where the rails 211 are provided on the base 2 which is a basement section of the three-dimensional measuring machine 1 and a coating film for rust prevention is provided on each of the rails 211, but the present invention may be applied to other types of bases and guide rails. Namely, the present invention may be applied to a member and a structural body on which guide rails for guiding a movable body are provided. For instance, the similar guide rail is provided also in the X-axial guide section 32 and the slider 4 is movably supported thereon by an air bearing device, although the configuration is not described nor shown. In this case, the present invention can be employed for the X-axial guide section 32 and the guide rails as a base for the slider 4 which is a movable body.

In the embodiment described above, the configuration is allowable in which the three-dimensional measuring machine 1 is connected to a computer or the like, and measurement of an object to be measured is performed under control by the computer or the like.

What is claimed is:

1. A measuring machine comprising a base that slidably supports a movable body, and a guide rail provided on the base and having a guide surface on which the movable body is slidably supported, the movable body adapted to slide via an air bearing device on the guide surface of the guide rail, the movable body being moved to measure a workpiece, wherein said guide rail is monolithically formed with said base, and a coating film for rust prevention is formed on said guide surface.

2. The measuring machine according to claim 1, wherein said coating film is made of ceramics.

3. The measuring machine according to claim 1, wherein said coating film is formed by means of plasma spray-coating.

4. The measuring machine according to claim 1, wherein a flat guide surface is formed on a surface of said base, and the guide rail is monolithically formed with said base on the guide surface.

5. The measuring machine according to claim 1, wherein said guide rail has two guide surfaces adjoining each other with a ridge line therebetween.

6. The measuring machine according to claim 5, wherein one of the two guide surfaces of said guide rail is a horizontal one, and the other is a vertical one.

7. The measuring machine according to claim 6, wherein a pair of guide rails are provided in parallel to each other, the horizontal guide surfaces of the guide rails are provided on the same plane, and the vertical guide surfaces of the guide rails are provided at positions opposed to each other.

8. The measuring machine according to claim 1, wherein a column that supports a measuring probe is provided on said base, and said movable body is a table for placing thereon the workpiece to be measured with said measuring probe.

9. The measuring machine according to claim 8, wherein said measuring machine is a three-dimensional measuring machine for carrying out three-dimensional measuring with said base and said movable body.

\* \* \* \* \*